(12) United States Patent
Jameson et al.

(10) Patent No.: US 9,605,506 B1
(45) Date of Patent: Mar. 28, 2017

(54) APPARATUS FOR AUTOMATICALLY LUBRICATING AN OIL WELL SUCKER ROD STUFFING BOX

(71) Applicants: William Jameson, Bakersfield, CA (US); Ryan Utt, Bakersfield, CA (US)

(72) Inventors: William Jameson, Bakersfield, CA (US); Ryan Utt, Bakersfield, CA (US)

(73) Assignee: Jameson Specialties, Inc., Bakersfield, CA (US)

( * ) Notice: Subject to any disclaimer, the term of this patent is extended or adjusted under 35 U.S.C. 154(b) by 208 days.

(21) Appl. No.: 14/517,546

(22) Filed: Oct. 17, 2014

Related U.S. Application Data

(60) Provisional application No. 61/892,337, filed on Oct. 17, 2013.

(51) Int. Cl.
| | |
|---|---|
| *E21B 33/08* | (2006.01) |
| *E21B 33/02* | (2006.01) |
| *E21B 44/00* | (2006.01) |
| *E21B 17/10* | (2006.01) |
| *E21B 43/00* | (2006.01) |
| *E21B 33/072* | (2006.01) |
| *F16J 15/18* | (2006.01) |

(52) U.S. Cl.
CPC .......... *E21B 33/08* (2013.01); *E21B 17/1071* (2013.01); *E21B 33/02* (2013.01); *E21B 33/072* (2013.01); *E21B 43/00* (2013.01); *E21B 44/00* (2013.01); *F16J 15/18* (2013.01); *F16J 15/182* (2013.01)

(58) Field of Classification Search
CPC .......... F16J 15/182; F16J 15/18; E21B 33/08; E21B 33/072

USPC ................................. 166/84.1, 84.2; 277/329
See application file for complete search history.

(56) References Cited

U.S. PATENT DOCUMENTS

| | | | | |
|---|---|---|---|---|
| 3,209,830 | A * | 10/1965 | Orr ........................ | E21B 33/072 166/66 |
| 3,830,306 | A * | 8/1974 | Brown .................... | E21B 34/02 166/334.2 |
| 5,335,730 | A * | 8/1994 | Cotham, III ............ | E21B 43/12 166/374 |
| 7,343,969 | B1 * | 3/2008 | Busch ..................... | E21B 33/08 166/387 |

OTHER PUBLICATIONS

Nov. 2011, Graco , Inc.—G3 Lubrication Pump—340574ENEU-C.*
Nov. 2010 Graco , Inc.—G3 Lubrication Pump—340574ENEU-C.*
Mar. 23, 2011 YouTube—Graco, Inc. G3 Lubrication Pump.*
Nov. 2012 Instructions—Graco—G3 Automatic Lubrication Pump—3A0414N.*
Swagelock PTR-976; Oct. 2012—316 Stainless Steel.*

* cited by examiner

*Primary Examiner* — George Gray
(74) *Attorney, Agent, or Firm* — James M. Duncan, Esq.; Klein DeNatale Goldner

(57) ABSTRACT

A stuffing box lubrication system for oilfield pumping units automatically delivers to the stuffing box, at specified time intervals, a precise volume of lubricant. The stuffing box lubrication system has a grease reservoir, a pump, a controller, a high pressure hose and grease fitting, and a stuffing box which receives the grease. In situations where the stuffing box in use is not equipped with a ported inlet for receiving the grease, the present invention may further include a stuffing box adapter, having a ported inlet, where the stuffing box adapter couples with the stuffing box.

16 Claims, 9 Drawing Sheets

APPARATUS FOR AUTOMATICALLY LUBRICATING AN OIL WELL SUCKER ROD STUFFING BOX

CROSS-REFERENCE TO RELATED APPLICATIONS

This is a non-provisional application which claims priority to provisional patent application No. 61/892,337 filed on Oct. 17, 2013.

BACKGROUND OF THE INVENTION

The present invention generally relates to artificial lift systems which are utilized for production of fluids from subsurface reservoirs, including oil, water, and liquid phase hydrocarbons. More particularly, the present invention is utilized with artificial lift systems where a subsurface pump is actuated by a plurality of rods connected end-to-end, herein collectively referred to as a "rod string." The rod string is set within a plurality of tubing joints likewise connected end-to-end, wherein the tubing joints are collectively referred to as a "tubing string." Actuation of the subsurface pump lifts the fluid upwardly from the subsurface pump to the surface, where the fluids flow in the annular space between the rod string and the inside diameter of the tubing string as the fluid flows upwardly.

There are generally three different types of subsurface pumps which can be actuated by rod strings, two which are positive displacement pumps, and the third is a roto-dynamic pump. The first type of subsurface pump is a plunger/barrel pump, wherein the reciprocal motion of the rod string reciprocates the plunger within the pump barrel, such that liquids are drawn into the pump barrel and lifted upwardly through the tubing string. The reciprocating motion of the rod string is typically imparted by a pump jack. The second type is a progressive cavity pump, wherein the rotational motion of the rod string operates a rotor which turns within a stator, and fluid is transferred by means of the progress through the pump of a sequence of small fixed shape cavities as the rotor is turned. In these systems, the rod string is rotated by a motor/gear reducer combination installed at the surface. The third type of pump, the roto-dynamic pump, is a centrifugal pump in which the rod string rotates a series of impellers. This type of system utilizes a similar motor/gear reducer combination as utilized for the progressive cavity system.

For all of these systems, the uppermost rod in the rod string is a polish rod. The polished rod reciprocates in and out of, or rotates within, a stuffing box. The stuffing box is a close-fit assembly which cleans the polished rod, prevents debris from entering or exiting the well, and further prevents fluid from leaking from the well during operation. The stuffing box is typically mounted above a T-fitting at the top of the tubing. The stuffing box provides a dynamic seal along the length the polish rod. The stuffing box typically has a central passage through which the polish rod moves, while stuffing or packing material is compressed by an enclosing cap or fitting of the stuffing box which urges the packing material against the sides of the polish rod to create fluid seal. The packing materials are typically elastomers and other materials which are softer than the polish rod material.

The movement of the polish rod within the packing material generates friction, and thus heat, which breaks down and degrades the packing materials. This process reduces the integrity of the seal formed between the packing material and the polish rod. In further aggravation, the presence of solids in the produced fluid, such as sand, can accelerate this degrading of the packing material as well as adversely impact the life of the polish rod. The loss of the integrity of the seal between the polish rod and the packing material will result in the escape of fluids from the well which can result in environmental damage and the loss of valuable resources, and can result in significant clean-up expense and potential fines and penalties. Accelerated packing replacement also requires the expenditure of man-hours which might otherwise be avoided.

The lubrication of the polish rod and the packing material reduces the friction, and thus the heat, generated between the polish rod and packing material. This lubrication reduces the wear caused by movement of the polish rod within the packing material and extends the life of the packing and the polish rod. The typical lubricant used for this service is grease, which is typically placed in the interior of the stuffing box and carried by the polish rod into contact with the packing material. There are various proprietary lubricating greases which work particularly well for this service, where the greases may have enhanced mechanical and thermal stability, resistance to water, and corrosion resistance additives. Application of the lubricant is typically done by hand or by mechanically operated systems which continually apply a small dose of grease according to the motion of the walking beam of the pump jack, which may be connected with linkage or cable to a mechanical pump which strokes with the motion of the walking beam. While preferable to no lubrication at all, the manual lubrication requires the use of personnel, and can be overlooked and inconsistently applied. The mechanically operated systems are subject to failures in mechanical linkages, often have limited grease reservoirs, and may not deliver a consistent volume of grease into the stuffing box.

SUMMARY OF THE INVENTION

The presently disclosed invention is an automated stuffing box lubrication system for oilfield pumping units. The invention provides a precise volume of lubricant to the stuffing box at specified time intervals as selected by the operator. The system comprises a large capacity grease reservoir which supplies grease to the stuffing box by a pump which is activated by a controller. The controller can be programmed to provide a precise volume of grease on a periodic basis. The grease is injected into the stuffing box through a high pressure hose and grease fitting. The controller, pump, pump motor, and grease reservoir may be contained within an enclosure cabinet, with the power supply and other electrical components contained within a segregated internal enclosure. The controller has user friendly controls for modifying the lubrication volume and intervals. The controller may be connected into a field wide supervisory control and data acquisition system so that status of the unit may be monitored. The grease reservoir may be equipped with level controls which annunciate a low level alarm when the reservoir is getting low. Power to the unit may be provided by solar panel or by low voltage (110 volt) alternative current sources.

DETAILED DESCRIPTION OF THE EMBODIMENTS

Figure 1:
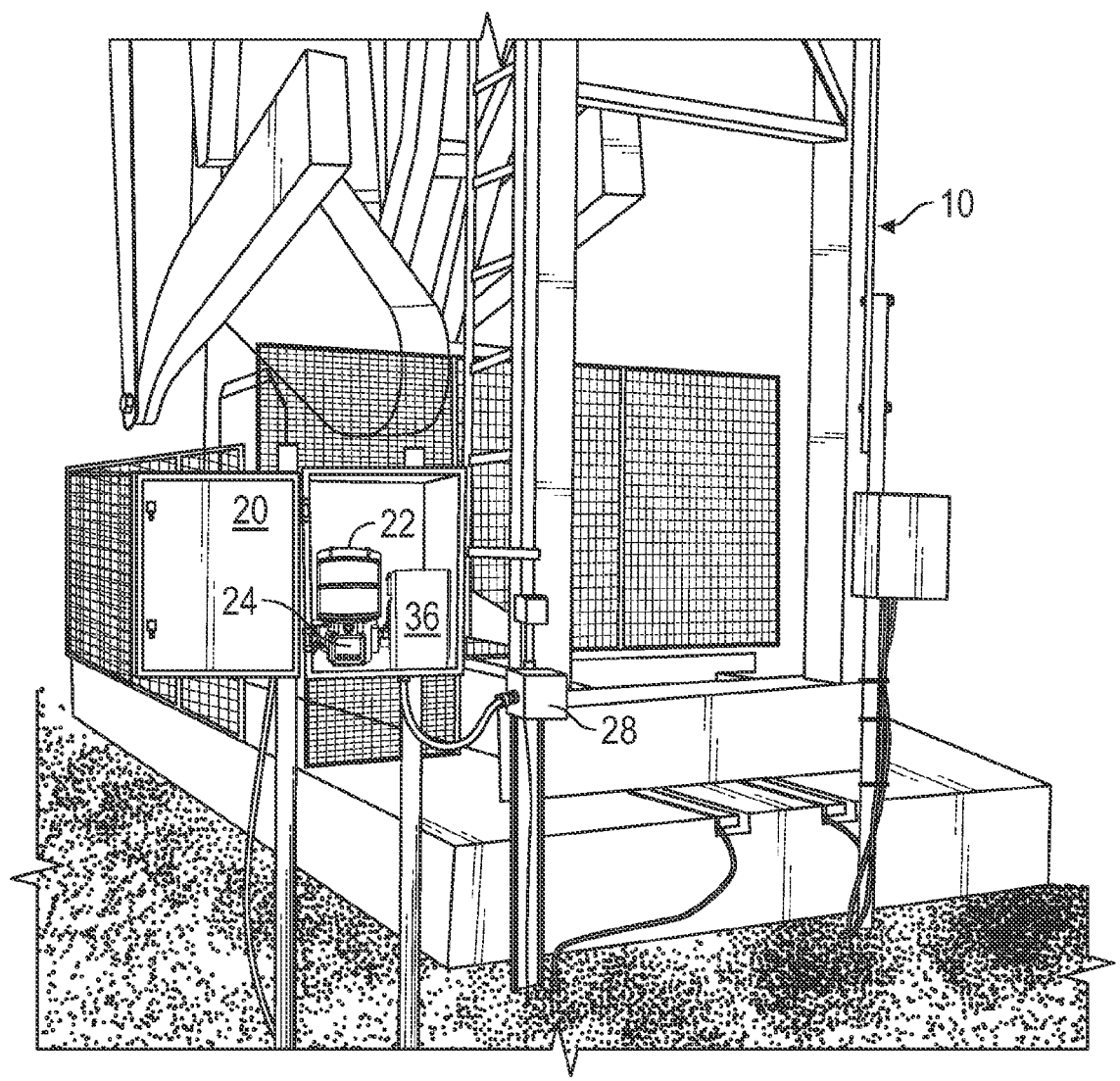
FIG. 1 shows a pump jack and an optional placement for embodiments of the pump and reservoir enclosure of the present invention.

Referring now to the figures, FIG. 1 shows a known pumping unit 10 which is utilized to impart a reciprocating motion to a rod string. However, as discussed above, embodiments of the invention may also be utilized with pumping systems which utilize rotating rod strings, such as progressive cavity pumps and roto-dynamic pumps. As indicated in FIG. 1, various components of the lubrication system are contained within a weatherproof enclosure 20 which is located at close proximity to the pumping unit 10.

Figure 2:
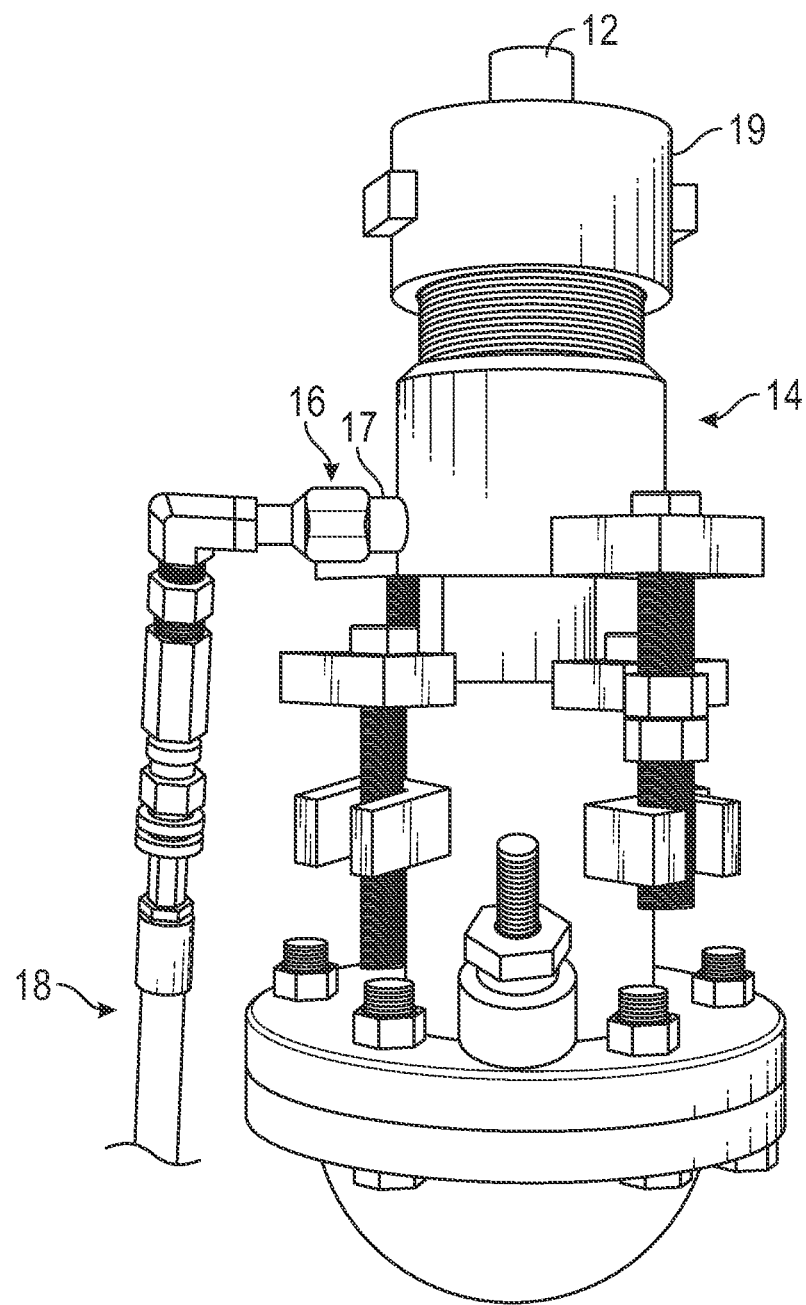
FIG. 2 shows a close up view of stuffing box for a reciprocating rod string which has an injection fitting and line utilized in embodiments of the present invention.

As shown in FIG. 2, the rod string terminates at the surface with a polish rod 12. Polish rod 12 reciprocates or rotates within stuffing box 14 which contains seal packing elements from maintaining a pressure seal around the polish rod 12. In the present invention, a grease fitting 16 provides access into a cavity containing the packing elements inside the stuffing box 14. A high pressure hose 18 conveys grease from the grease reservoir of the present invention through grease fitting 16 into the stuffing box 14 through ported inlet 17. Stuffing box 14 comprises a cap 19 which seals the stuffing box 14 around the polish rod 12.

Figure 9:
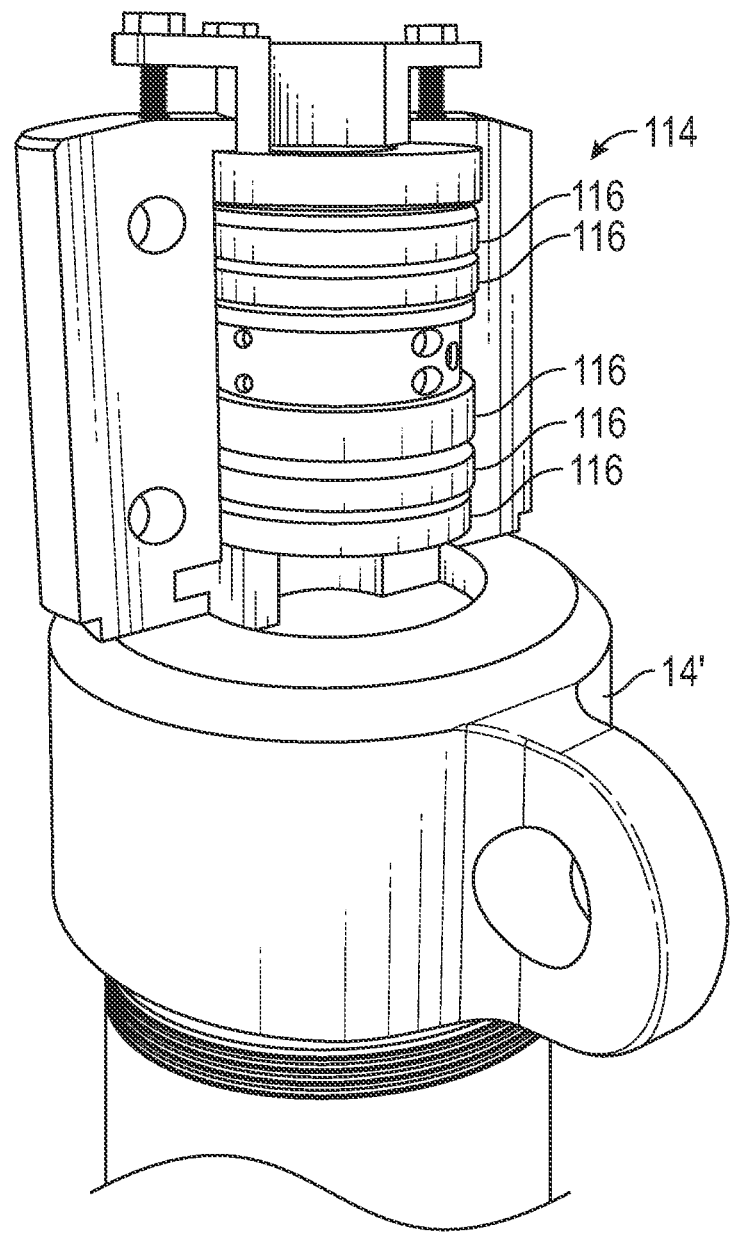
FIG. 9 shows an embodiment of a stuffing box adapter, in an open position, which allows use of the present system with alternative types of stuffing boxes which may be utilized on a well.
Figure 10:
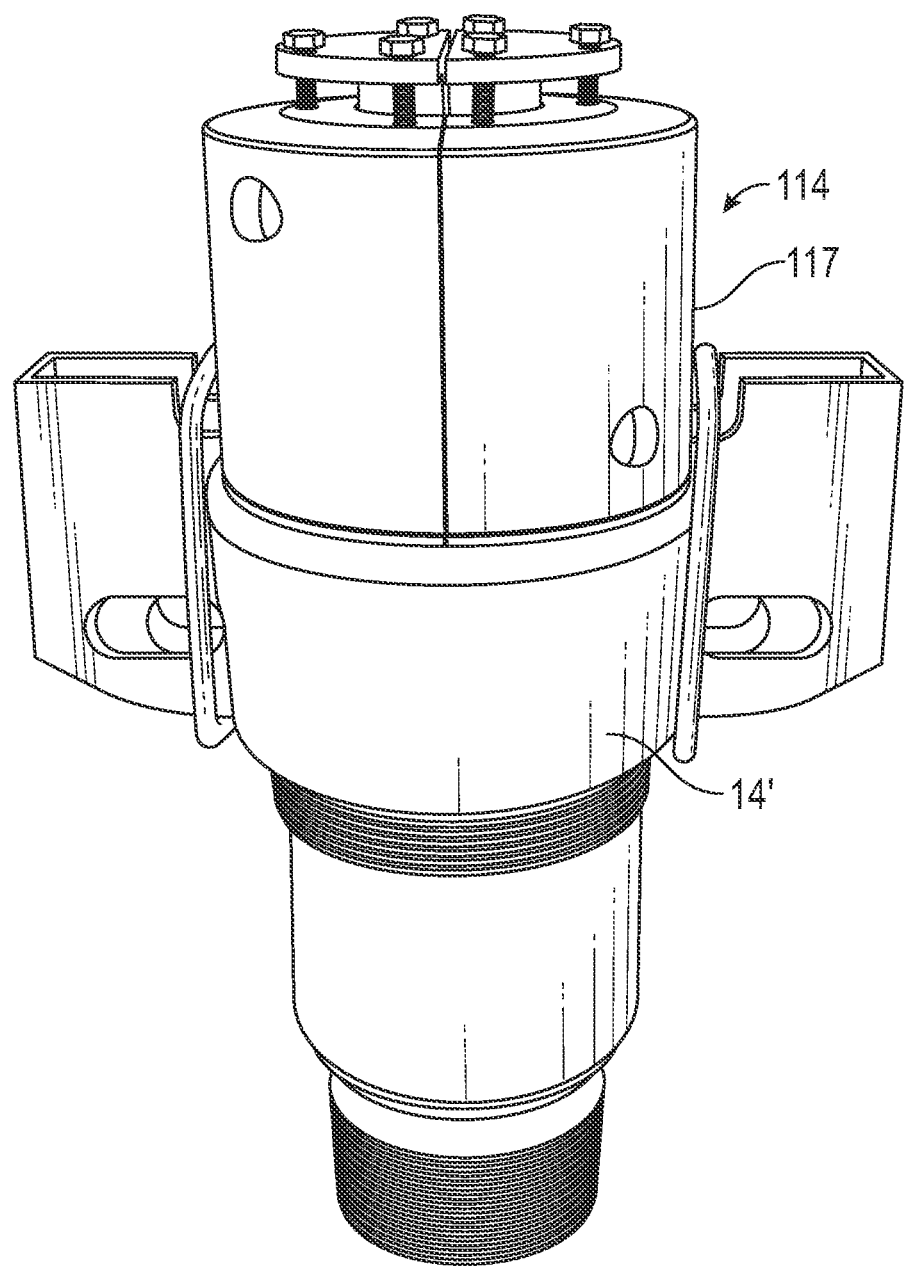
FIG. 10 shows the stuffing box adapter depicted in FIG. 9 in the closed position.

The inventors herein have found that a HERCULES brand stuffing box with a ported inlet works well for this application, but other stuffing boxes may be utilized and the system may be adapted to work with different brands and types of stuffing box. As described in greater detail below, FIGS. 9-10 depict a stuffing box adapter 114 which provides for connection of high pressure grease hose to the adapter, which is mounted adjacent to a stuffing box 14' which is not equipped with a ported inlet. Stuffing box adapter 114 allows a relatively easy solution to allow use of the present system with surface pumping equipment which is not otherwise compatible with the system.

Figure 3:
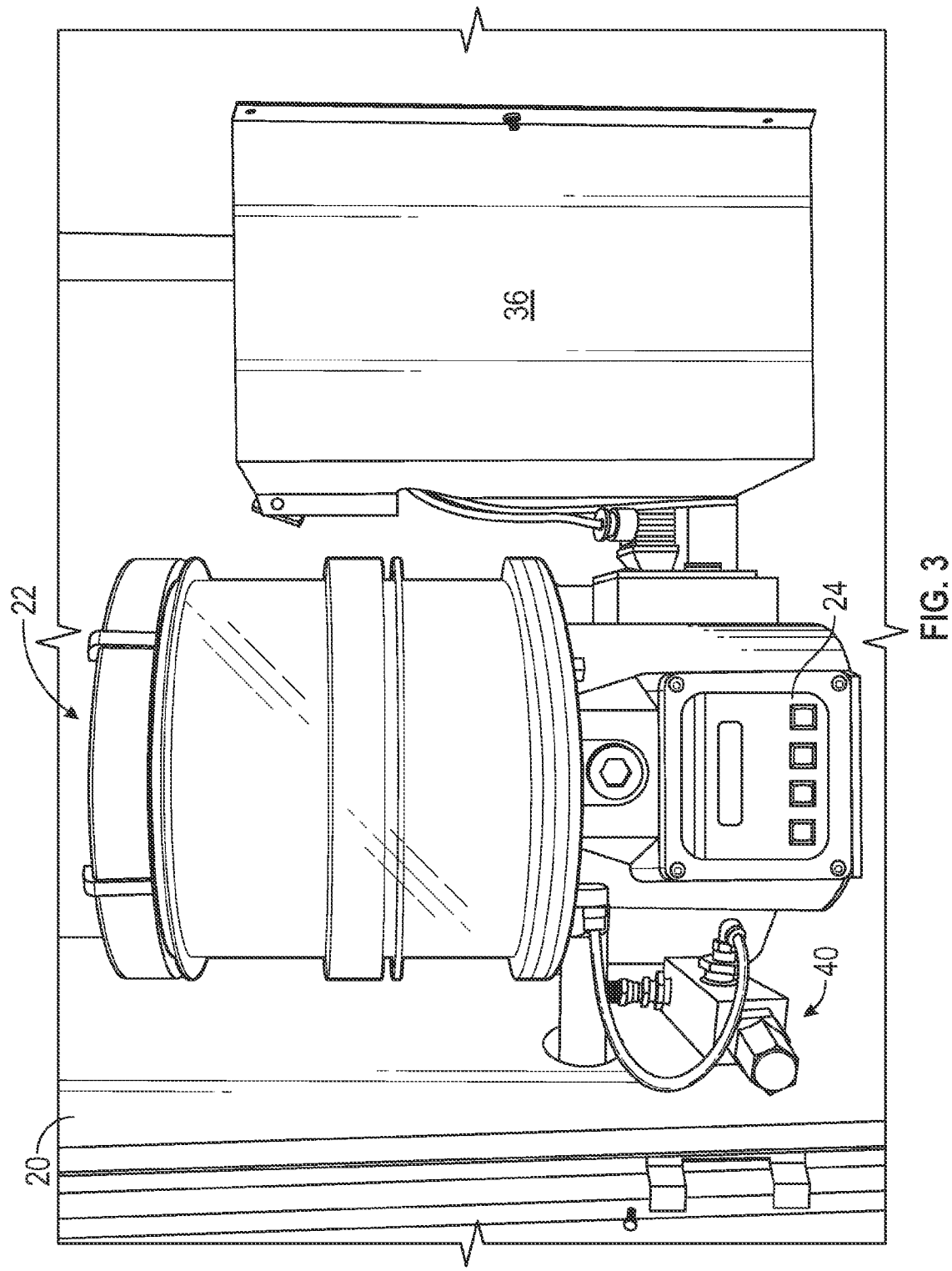
FIG. 3 shows an embodiment of the pump, reservoir, and enclosed power supply components which may be used in the present invention.

As shown in FIG. 3, enclosure 20 may contain the reservoir 22, controller 24 and power supply 32, which in FIG. 3, is contained within an internal enclosure 36. An alternating current source, such as junction box 28 shown in FIG. 1, may provide alternating current to the present invention. FIG. 3 shows a possible configuration of the reservoir 22, controller 24, grease discharge manifold 40 and inside enclosure 36, which may utilized to contain power supply 32.

Reservoir 22 and controller 24 may come as an integrated unit such as the BRAVO pump packaged as manufactured by DROPSA or the G3 ELECTRIC LUBRICATION PUMP manufactured by GRACO. These units are not otherwise known to be used for lubrication of oilfield pumping unit stuffing boxes. The reservoir 22 may have a variable capacity ranging from approximately 70 ounces to 540 ounces of grease. Controller 24 may be programmed to dispense practically any volume of grease over a particular time frame, with a typical application ranging from 0.5 to 2.0 ounces of grease per day. The larger reservoir and relatively small volumes of injected grease thus have the capability of providing an extended grease supply before the reservoir requires refilling. The grease utilized with the device may be a variety of different greases and containing various additives, such as corrosion inhibitor. A grease manufactured by CHEMTOOL INCORPORATED known as ALPHA 2000, has been found to provide good service for this application. Controller 24 allows the lubrication cycle to be set up on a daily basis or other periodic basis, with a timer typically controlling the grease injection events. The actual pump time for the grease injection is usually quite brief, with a small volume of grease injected in each cycle. The controller 24 can provide a readout of the grease injection cycles over a particular period of time. The controller 24 can be connected to a field wide network, such as a supervisory control and data acquisition system (SCADA) system for providing reports of the amount grease injected over a period of time. The system may also provide an alarm upon the detection of critical operating conditions, such as when the grease level is low or when the grease injection system is not operating.

Figure 4:
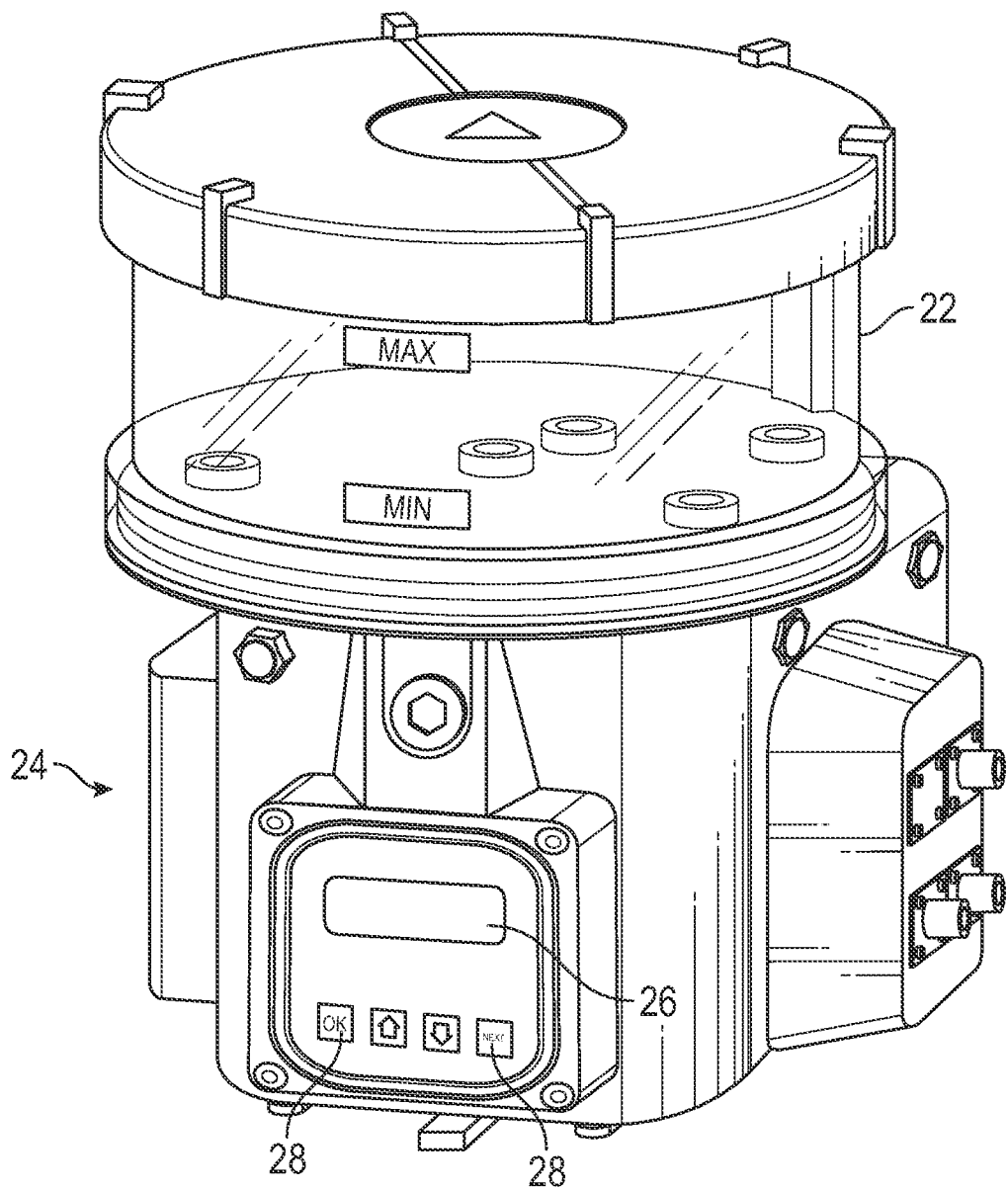
FIG. 4 shows a close up view of an embodiment of a grease reservoir, pump and controller which may be utilized in embodiments of the present invention.

An integrated reservoir 22—controller 24 is shown in FIG. 4. Controller 24 comprises a user interface, a pump and a motor. As shown in the Figure, the controller 24 has a user interface having a digital display 26 which is controlled by key programmable controls 28. Controller 24 may be equipped with a data management system allows a user to download, via a USB port, performance history for the lubrication system, such as cycle detection and run times, so the effectiveness of the lubrication system may be monitored.

Figure 5:
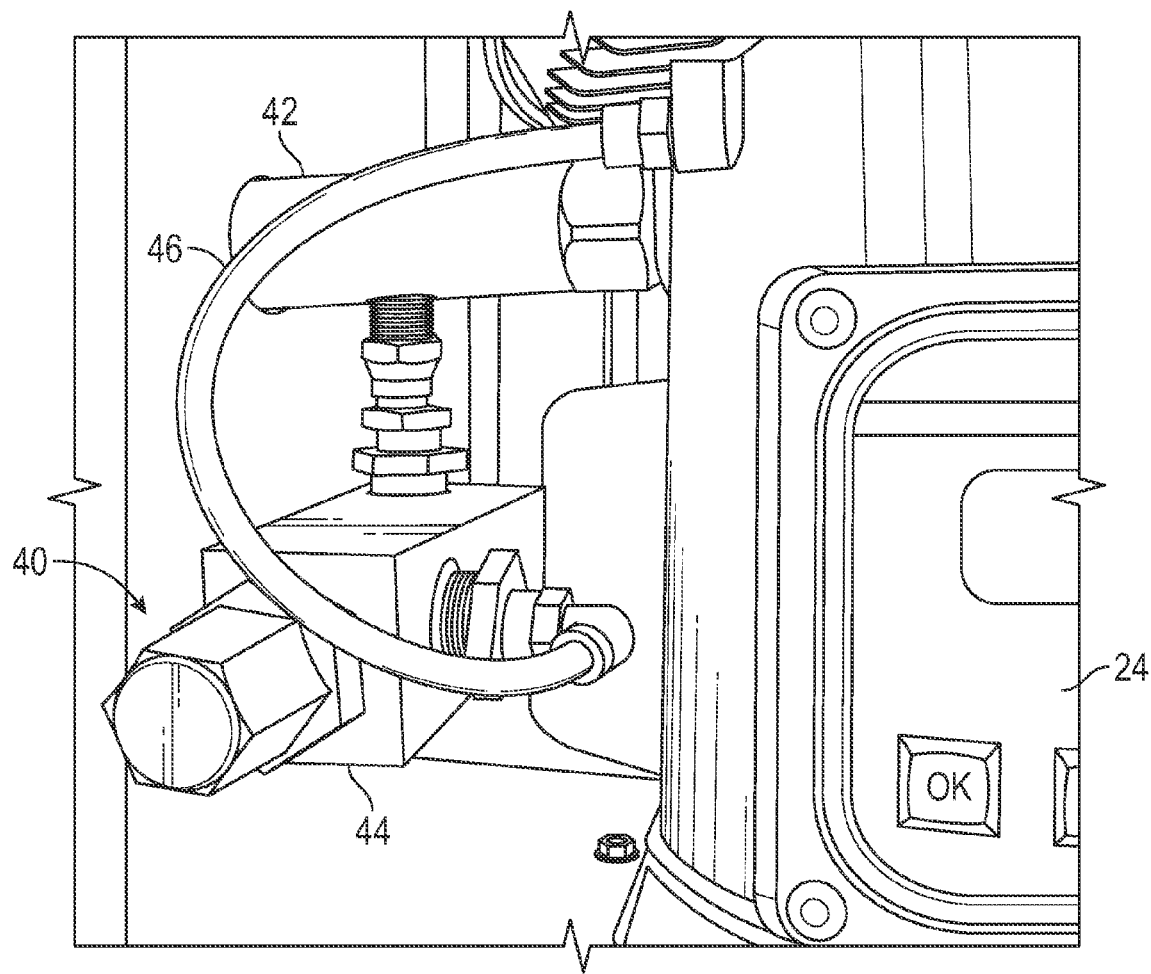
FIG. 5 shows a close-up view of the grease outlet of an embodiment of the present invention.

FIG. 5 shows a close up view of the grease discharge manifold 40 of the device. The discharge manifold has a delivery conduit 42 which delivers grease to the high pressure hose 18 shown in FIG. 2. The grease discharge manifold 40 may comprise a grease bypass valve 44. In the event the discharge pressure reaches a pre-set maximum, bypass valve 44 recirculates the grease back to the integrated reservoir 22—controller 24 through bypass line 46 to protect the stuffing box from being over pressured. Typical operating discharge pressures may be 500 psi, with a bypass valve set to open at a preset pressure, such as 1500 psi.

Figure 6:
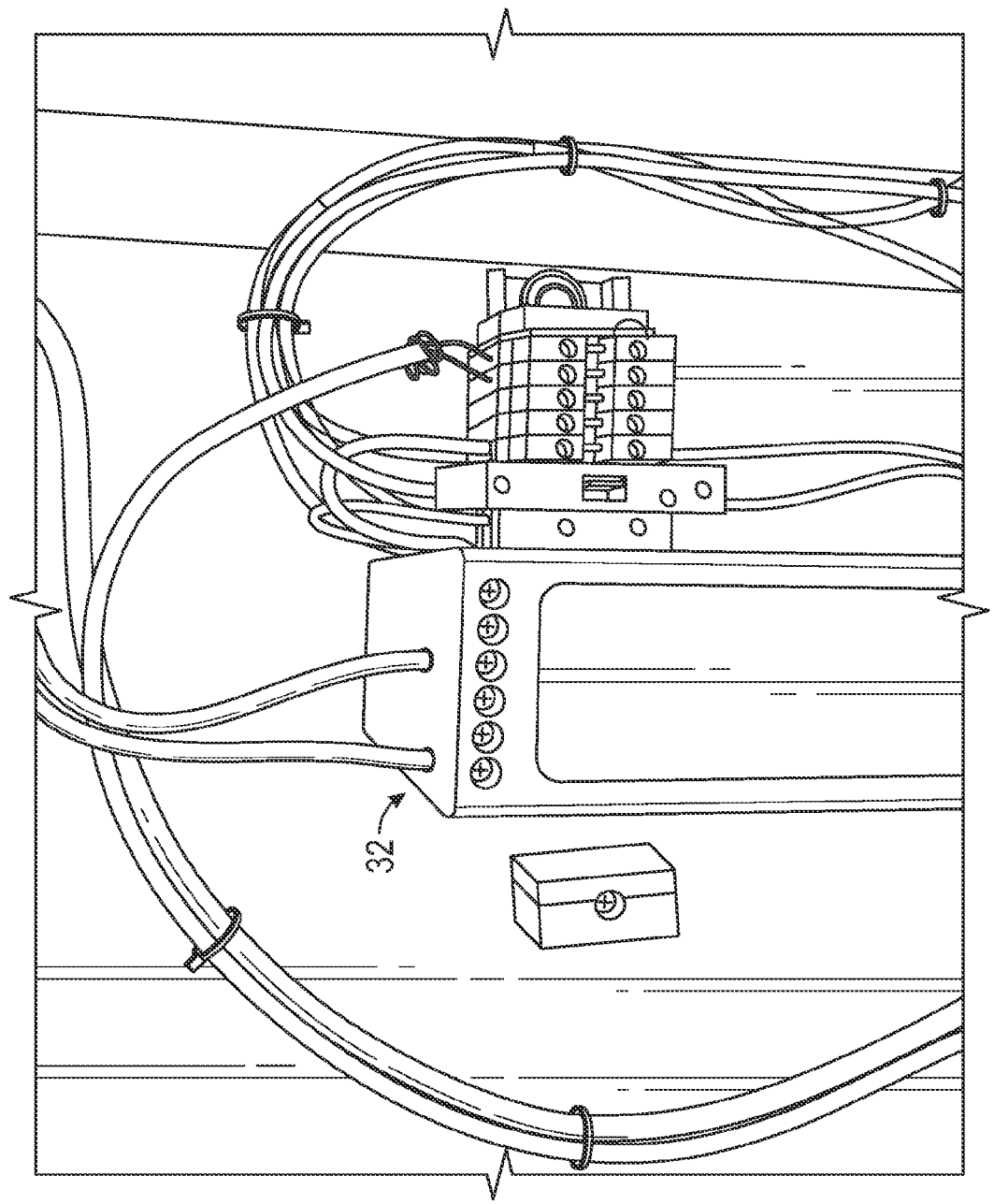
FIG. 6 shows a close-up view of a power supply which may be utilized with embodiments of the present invention, which has an input voltage of 110 VAC and a 12 VDC output voltage for powering the pump and controls for embodiments of the present invention.
Figure 7:
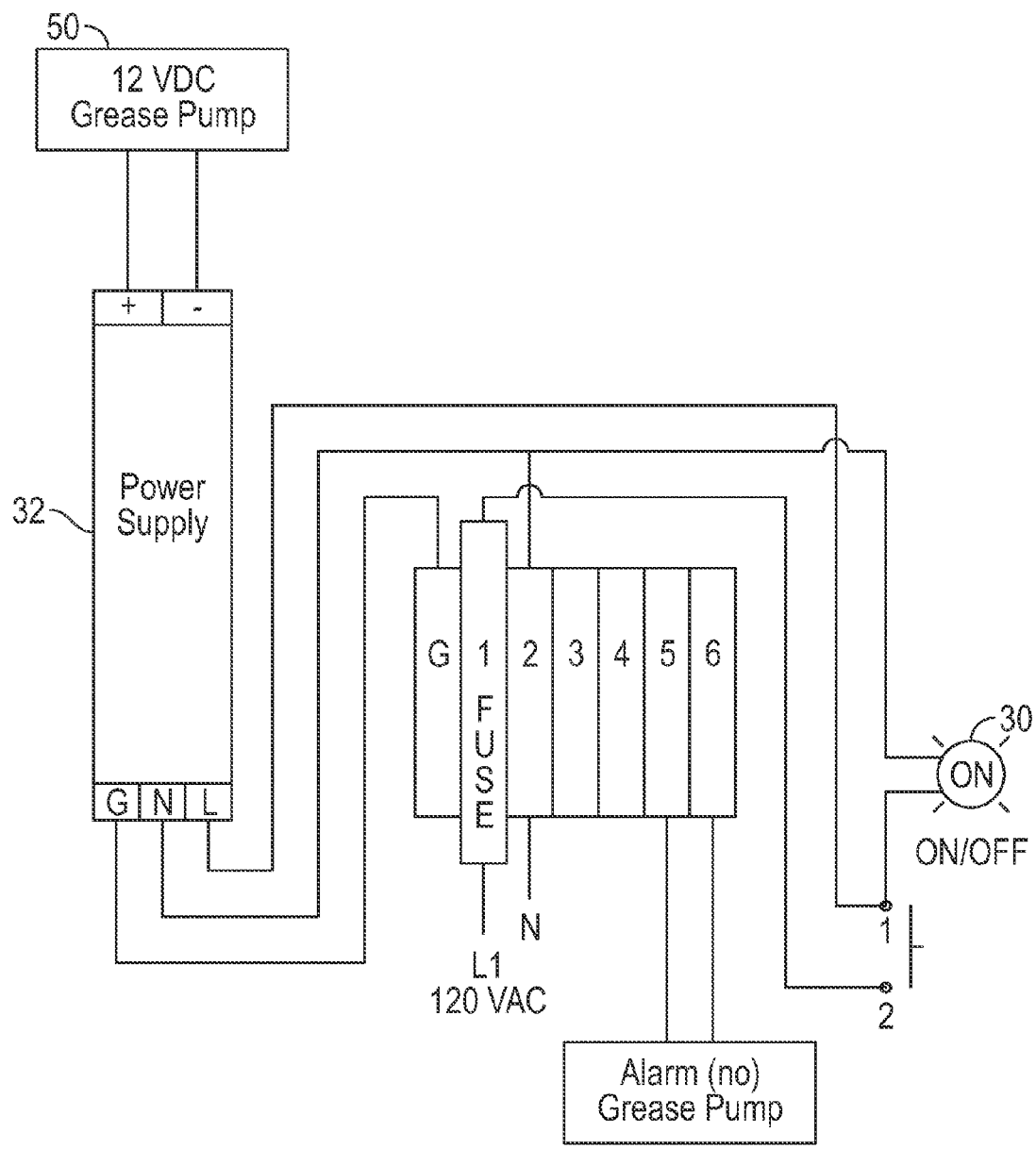
FIG. 7 shows a wiring diagram from an embodiment of the present invention.
Figure 8:
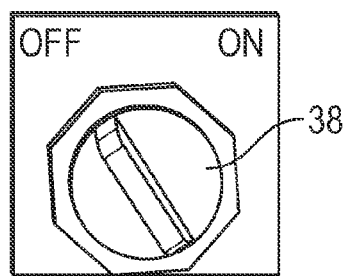
FIG. 8 shows an exterior operating switch on the enclosure of an embodiment of the present invention.

FIG. 6 shows an acceptable power supply 32 for providing power to the controller 24 and its pump and motor. FIG. 7 shows a simple schematic for power supply 32, showing the alternative current line in, the power supply connect to the grease pump 50, which will typically run on relatively low direct current voltage, and the connection to various alarms. These alarms may indicate when the grease level is low or show a malfunction in system, such as the operation of grease bypass valve 44 because of a high pressure situation. The circuit includes annunciator light 30 which shows when the controller 24 is in operation.

As indicated in FIGS. 1 and 3, power supply 32 may be stored within its own enclosure 36 to separate it from the grease reservoir 22 and controller 24. The device may be operated by a manual override control switch 38 which may be located on the exterior of enclosure 20 for easy access by maintenance personnel. Annunciator light 30 may also be located on the exterior of enclosure 20.

FIGS. 9-10 depict a stuffing box adapter 114 which provides for connection of high pressure grease hose to the adapter, which is mounted adjacent to a stuffing box 14' which is not equipped with a ported inlet. Stuffing box adapter 114 may contain packing elements 116 which seal around the polish rod 12. Similar to the installation utilized with stuffing box 14, stuffing box adapter 114 will have high pressure hose 18 which conveys grease from the grease reservoir of the present invention through a grease fitting inserted in a ported inlet 117. Grease will then be carried into the stuffing box 14' by the reciprocation of the polish rod.

While the above is a description of various embodiments of the present invention, further modifications may be employed without departing from the spirit and scope of the present invention. Thus the scope of the invention should not be limited according to these factors, but according to the following appended claims.

What is claimed is:

1. An automated lubrication system for an oilfield polish rod which moves within a stuffing box having a plurality of packing elements disposed about the polish rod, the automated lubrication system comprising:
   the stuffing box which provides a housing for the packing elements which are disposed in a stacked configuration about the polish rod, the stuffing box comprising a ported inlet penetrating the housing directly adjacent to the stacked configuration of the packing elements:
   a grease fitting connected to the ported inlet;
   a lubricant reservoir containing a grease lubricant;
   a lubricant pump hydraulically connected to the lubricant reservoir;
   a pump controller which activates and deactivates the lubricant pump upon programmed instructions;
   a power supply conductively connected to the pump controller; a pressure hose connecting the lubricant pump to the grease fitting the pressure hose having a pressure rating ranging from 500 to 1500 psi wherein grease is injected through the pressure hose through the grease fitting and directly into the stacked configuration of packing elements adjacent to the ported inlet; and
   an enclosure which contains the lubricant reservoir, the lubricant pump, the pump controller, and the power supply.

2. The automated lubrication system of claim 1 wherein the power supply is contained within a second enclosure which is contained within the enclosure.

3. The automated lubrication system of claim 1 wherein the pump controller comprises an alarm circuit which activates an annunciator when a low grease level is detected.

4. The automated lubrication system of claim 1 wherein the lubricant pump and the lubricant reservoir comprise an integrated unit.

5. The automated lubrication system of claim 1 wherein a grease discharge manifold is disposed between the grease pump and the pressure hose, wherein the grease discharge manifold is contained within the enclosure.

6. The automated lubrication system of claim 5 wherein the grease discharge manifold comprises a grease bypass valve which returns the grease lubricant upon the lubricant pump reaching a preset discharge pressure.

7. The automated lubrication system of claim 1 further comprising a manual override control switch for manual control.

8. The automated lubrication system of claim 1 wherein the pump controller comprises an alarm circuit which activates an annunciator when a bypass valve opens.

9. An automated lubrication system for an oilfield polish rod which moves within a stuffing box having a plurality of packing elements disposed in a stacked configuration about the polish rod, the automated lubrication system comprising:
   the stuffing box which provides a housing for the packing elements which are disposed about the polish rod;
   a stuffing box adapter connected to the stuffing box, the stuffing box adapter comprising a ported inlet, the ported inlet penetrating the housing directly adjacent to the stacked configuration of said packing elements, and a grease fitting connected to the ported inlet;
   a lubricant reservoir containing a grease lubricant;
   a lubricant pump hydraulically connected to the lubricant reservoir;
   a pump controller which activates and deactivates the lubricant pump upon programmed instructions;
   a power supply conductively connected to the pump controller;
   a pressure hose connecting the lubricant pump to the grease fitting the pressure hose having a pressure rating ranging from 500 to 1500 psi wherein grease is injected through the pressure hose through the grease fitting and directly into the stacked configuration of packing elements adjacent to the ported inlet; and
   an enclosure which contains the lubricant reservoir, the lubricant pump, the pump controller, and the power supply.

10. The automated lubrication system of claim 9 wherein the power supply is contained within a second enclosure which is contained within the enclosure.

11. The automated lubrication system of claim 9 wherein the pump controller comprises an alarm circuit which activates an annunciator when a low grease level is detected.

12. The automated lubrication system of claim 9 wherein the lubricant pump and the lubricant reservoir comprise an integrated unit.

13. The automated lubrication system of claim 9 wherein a grease discharge manifold is disposed between the grease pump and the pressure hose, wherein the grease discharge manifold is contained within the enclosure.

14. The automated lubrication system of claim 13 wherein the grease discharge manifold comprises a grease bypass valve which returns the grease lubricant upon the lubricant pump reaching a preset discharge pressure.

15. The automated lubrication system of claim 9 further comprising a manual override control switch for manual control.

16. The automated lubrication system of claim 9 wherein the pump controller comprises an alarm circuit which activates an annunciator when a bypass valve opens.

* * * * *